US006233319B1

(12) United States Patent
Cox et al.

(10) Patent No.: US 6,233,319 B1
(45) Date of Patent: *May 15, 2001

(54) METHOD AND SYSTEM FOR DELIVERING MESSAGES TO BOTH LIVE RECIPIENTS AND RECORDING SYSTEMS

(75) Inventors: Richard Vandervoort Cox, New Providence; Bruce Lowell Hanson, Little Silver; Kenneth Mervin Huber, Red Bank; Candace Ann Kamm, Morristown; Lawrence Richard Rabiner, Berkeley Heights, all of NJ (US)

(73) Assignee: AT&T Corp., New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/001,204

(22) Filed: Dec. 30, 1997

(51) Int. Cl.$^7$ .................................................. H04M 1/64
(52) U.S. Cl. ......................... 379/88.22; 379/69; 379/406
(58) Field of Search .................. 379/67.1, 69, 88.07, 379/88.08, 88.22, 90.01, 209, 355, 386, 391, 406, 410

(56) References Cited

U.S. PATENT DOCUMENTS

| 4,405,833 | * | 9/1983 | Cave et al. ............................. 379/69 |
| 4,696,031 | * | 9/1987 | Freudberg et al. ................. 379/386 |
| 4,941,168 | * | 7/1990 | Kelly, Jr. et al. .................... 379/69 |
| 5,371,787 | * | 12/1994 | Hamilton ............................. 379/386 |
| 5,448,624 | * | 9/1995 | Hardy et al. .......................... 379/69 |
| 5,638,424 | * | 6/1997 | Denio et al. ........................ 379/67.1 |
| 5,644,624 | * | 7/1997 | Caldwell ............................... 379/69 |
| 5,809,113 | * | 9/1998 | Lieuwen ............................... 379/69 |

FOREIGN PATENT DOCUMENTS

92/08309  *  5/1992  (WO) ................................... 379/69

* cited by examiner

*Primary Examiner*—Scott L. Weaver
(74) *Attorney, Agent, or Firm*—Morgan & Finnegan L.L.P.

(57) ABSTRACT

Method and system for delivering a message over a telecommunications network to a recipient comprising transmitting a message over the telecommunications network to the recipient when a predetermined energy/silence condition is detected, performing echo cancellation on a signal communicated from the telecommunications network, and monitoring the signal to detect the energy/silence condition.

27 Claims, 3 Drawing Sheets

METHOD AND SYSTEM FOR DELIVERING MESSAGES TO BOTH LIVE RECIPIENTS AND RECORDING SYSTEMS

FIELD OF THE INVENTION

The present invention relates generally to the field of voice telecommunication, and more specifically to the field of delivering messages to live recipients and recording devices.

BACKGROUND OF THE INVENTION

Due to the ubiquity of telephone answering devices, such as answering machines, voice-mail systems, etc., few telephone calls go unanswered. Thus, due to this increase in telephone connectivity, the importance of reliably and efficiently communicating messages to live recipients, as well as recording devices, is great. Although the ability of a live caller to distinguish whether a live person or a recording device is answering a telephone call is often straightforward, such distinction is more difficult when delivering pre-recorded messages.

Currently, systems are available where pre-recorded messages are delivered in the same predetermined manner to live recipients or recording devices. In a typical scenario, a telephone call is placed, and as soon as the call is answered, and a signal is received by the recipient (known as answer supervision), the pre-recorded message is played. Often these systems are instructed to play the message up to three times to ensure that the entire message is received. If the message is received by a recording device, the recordation of the message will begin at whatever point the message is at when the device goes into its recording mode. Thus, upon playing the incoming message, recipients often hear a message starting at the middle of the pre-recorded statement, and then the entire message one or two times thereafter.

A significant disadvantage of current message delivery systems is the technical compromise between facilitating quick delivery to live parties, against ensuring that the message is not delivered to the answering device until it is ready to record. The delivery systems for pre-recorded messages, that are currently available, are not capable of adapting their delivery to the environment created by the recipient. It is therefore desirable to improve the delivery of pre-recorded messages such that an entire message may be delivered from beginning to end in a single transmission, and where the responsiveness of the delivery to a live recipient and a recording device are equally reliable.

SUMMARY OF THE INVENTION

It is therefore an advantage of the present invention to maximize responsiveness in delivering a pre-recorded message to either a live person or recording device. This advantage is accomplished by monitoring the environment of a recipient of the pre-recorded message for an initial predetermined silence/energy condition and begin message delivery when that condition is met. After message delivery has begun, the energy/silence condition may be continuously monitored, and message delivery ceased upon sensing a predetermined level of noise or speech energy. Moreover, in another aspect of the present invention, the method includes recommencing the transmission of the pre-recorded message from the beginning upon subsequent detection of the desired silence/energy condition.

In yet another aspect of the present invention, the method further includes monitoring the environment of a recipient for a predetermined initiating energy condition, and enabling the message delivery system to communicate such message immediately after sensing such initiating energy condition.

Accordingly, the responsiveness of the present method and system is optimized regardless of the environment created by the recipient of the telephone network. This is effectuated by establishing continuous communication between a silence detector, an echo canceller and a message player. Message delivery ceases when a predetermined level of speech or noise from the recipient is detected, and such delivery recommences upon sensing the predetermined energy/silence condition. As a result, the entire pre-recorded message is delivered to the recipient.

It is another advantage of the present invention to facilitate the transmission of a predetermined number of messages, each in its entirety, to a live recipient or recording device. This advantage is accomplished by establishing communication between a silence detector, an echo canceller and a message player, which allows pre-recorded messages to be delivered from one to a predetermined number of times, and where such delivery is recommenced whenever a noise or speech energy signal interrupts the delivery of the pre-recorded message.

These and other advantages of the present invention will become apparent to those of ordinary skill in the art after review of the detailed description, figures and claims of the present invention.

DETAILED DESCRIPTION

Figure 1:
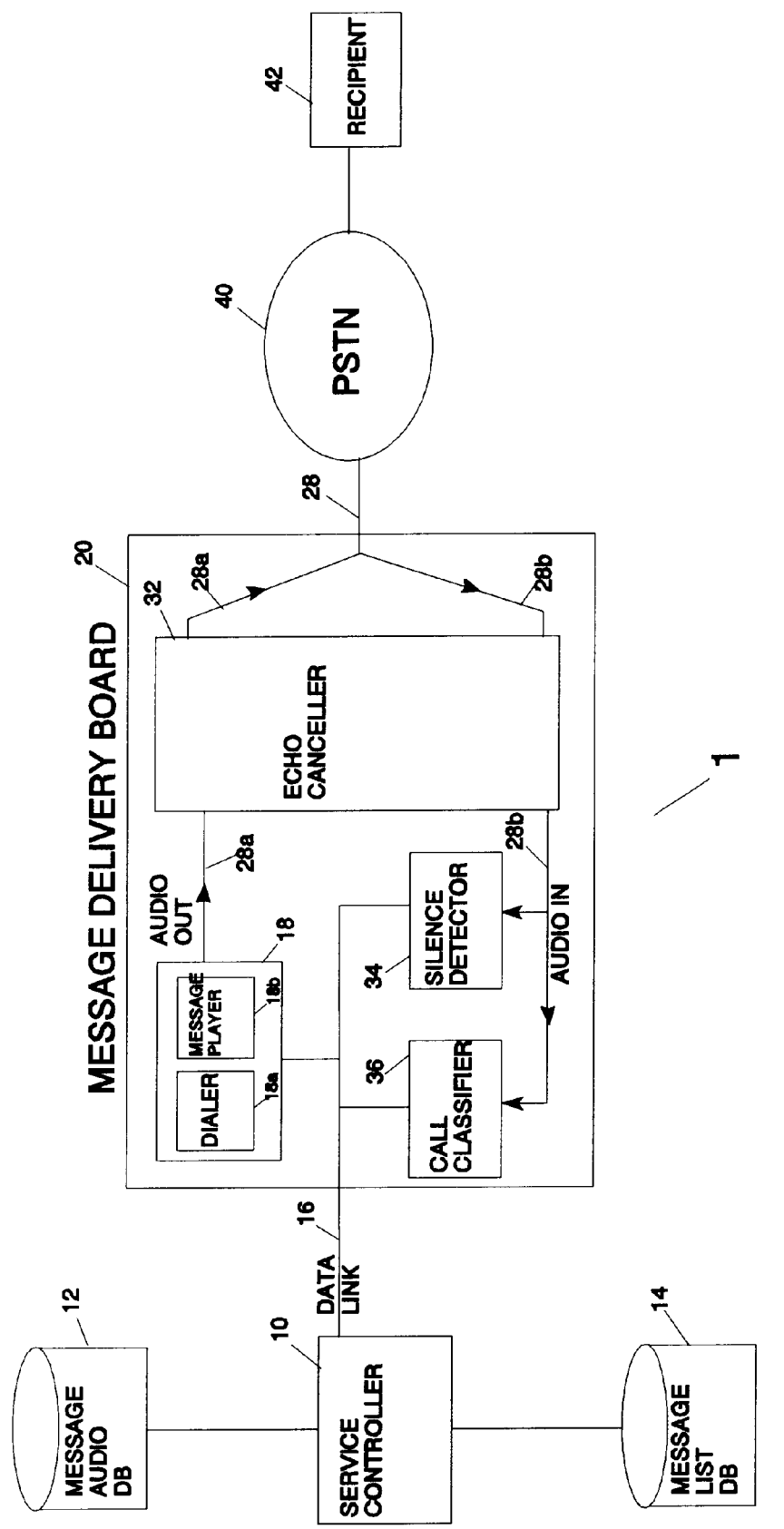
FIG. 1 is a schematic diagram of a message delivery system according to an aspect of the present invention.

FIG. 1 illustrates a message delivery system 1 in accordance with a preferred embodiment of the present invention in which recipients 42 (either live or recording devices) receive messages that are pre-recorded and stored in message audio database 12 of message delivery system 1. A message list database 14 may also be employed to store the telephone number or telephone numbers of one to a plurality of prospective recipients.

Service controller 10 is employed in delivery system 1 to coordinate the delivery of the predetermined, pre-recorded message to the appropriate recipient 42. Service controller 10 also communicates the telephone number stored in the message list database 14 of the intended recipient 42 via data link 16. Data link 16 is a communication medium that permits delivery of the message and database data to message delivery module 20 of delivery system 1.

Upon receiving message delivery data from service controller 10 via data link 16, telephony dialer 18a dials the telephone number of intended recipient 42. A signal is delivered to and from message delivery module 20 via communication medium 28 which interconnects message delivery module 20 and a telecommunications network, such as a public switched telephone network (PSTN) 40. Communication medium 28 may be, for example, a four wire system with outbound communication medium 28a and inbound communication medium 28b. Communication medium 28 interconnects the various components of message delivery module 20, such as telephony interface control 18 (comprising of dialer 18a and message player 18b), echo canceller 32, silence detector 34 and call classifier 36 to the PSTN 40. It should be noted that message delivery system 1 may employ one to a plurality of message delivery modules 20.

Upon dialing the call, message delivery system 1 classifies the call outcome (i.e., busy, no answer, intercept, etc.) via call classifier 36. If answer supervision is not received, service controller 10 can instruct message delivery system 1 to either retry the call or terminate delivery. If, however, system 1 gets answer supervision, a detector, such as a silence detector 34 is activated. Detector 34 may alternatively comprise other types of energy, noise or speech detectors. Detector 34 monitors whether there is noise or silence on inbound communication medium 28b which is being generated by recipient 42 over the PSTN 40. Detector 34 may be devised to detect an initiating silence or energy condition of a predetermined threshold (i.e., duration of silence, magnitude of energy, combination of speech and silence condition, etc.). In the preferred embodiment, echo canceller 32 is interconnected between detector 34 and the PSTN 40 to reliably monitor energy generated by recipient 42 over the PSTN 40.

Figure 2:
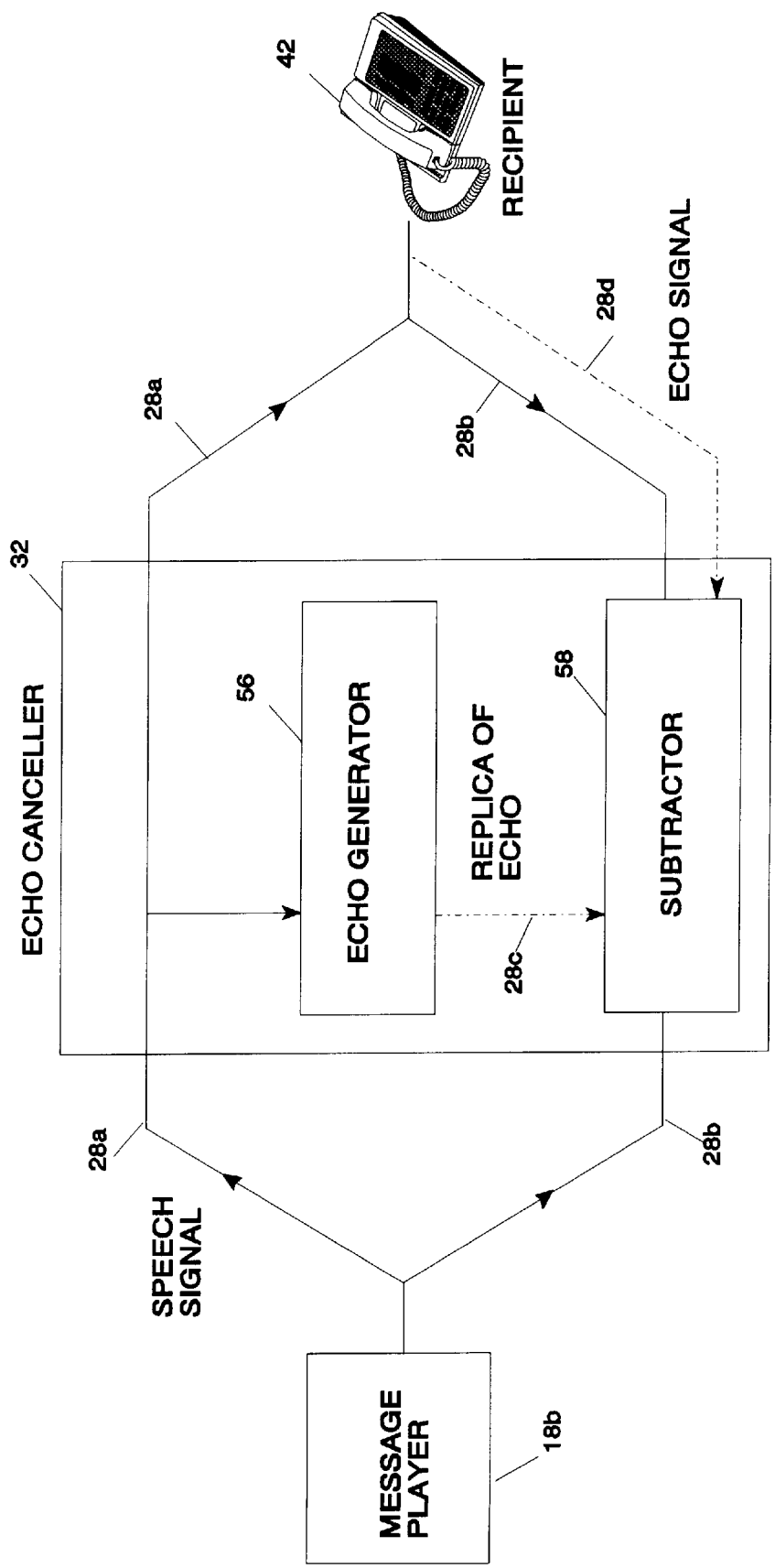
FIG. 2 is a schematic diagram of an echo cancellation system.

A typical echo canceller 32 is illustrated in FIG. 2. Echo canceller 32 uses the signal processed over outbound communication medium 28a generated by message player 18b to generate a replica signal 28c via echo generator 56. The replica signal 28c and the echo signal 28d which is transmitted by inbound communication medium 28b is transmitted through subtractor 58 of echo canceller 32. Echo canceller 32 cancels out the echo created over signals transmitted through outbound communication medium 28a.

Returning to FIG. 1, once detector 34 senses a predetermined initiating energy/silence condition over inbound communication medium 28b, message player 18b is instructed to immediately deliver the predetermined, pre-recorded message. In accordance with the preferred embodiment of this invention, the predetermined initiating energy/silence condition will likely comprise speech energy followed by a predetermined silence condition, indicating that message delivery system 1 has connected to a recipient, and that the recipient is ready to receive the pre-recorded message. Of course, message delivery system 1 may be devised so that message player 18b begins delivery of a pre-recorded message when one of a variety of predetermined energy/silence conditions is detected by detector 34. Message player 18b will cease delivery of the message upon detection of speech or some other type of energy communicated through inbound communication medium 28b. Delivery of the pre-recorded message is once again immediately begun upon the detection of a predetermined energy/silence condition by detector 34.

Figure 3:
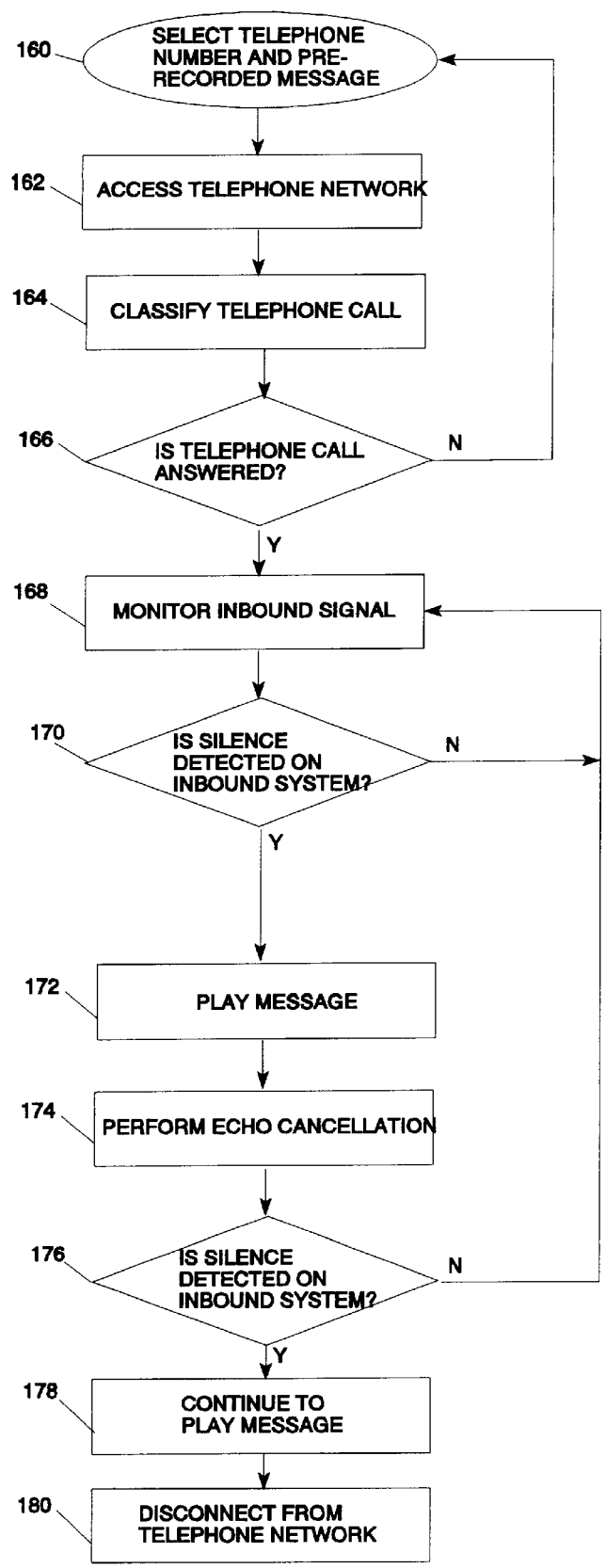
FIG. 3 is a flow chart of a method to deliver messages according to an aspect of the present invention.

Referring now to FIG. 3, there is illustrated a block flow chart of a preferred method of using message delivery system 1 illustrated in FIG. 1. In step 160, service controller 10 provides the necessary data (i.e., telephone number and pre-recorded message) to initiate message delivery system 1 in FIG. 1. The pre-recorded message is transmitted to message player 18b, while the desired telephone number is transmitted to dialer 18a, as instructed in step 162.

Step 164 then classifies the telephone call. As shown in step 166, if answer supervision is not received, the system returns to step 160 to recommence the process. If, however, answer supervision is received, the signal communicated over inbound communication medium 28b is monitored, in step 168, by detector 34.

As shown in step 170, if a predetermined initiating energy/silence condition is detected, the pre-recorded message is delivered to recipient 42, as shown in step 172. If a predetermined energy/silence condition is not met (i.e., speech or noise continues without sufficient silence), message delivery system 1, in FIG. 1, continues to monitor the signal over inbound communication medium 28a for a predetermined initiating energy/silence condition, as illustrated in step 168. Message delivery system 1 continues to monitor the inbound communication medium 28a (step 168) until a predetermined energy/silence condition is detected.

In step 174, echo cancellation is performed as soon as message delivery begins, thereby allowing only the energy generated by recipient 42 of the PSTN 40 to be monitored by detector 34. As shown in step 176, message delivery system 1 continues to monitor for energy, and is employed for a predetermined time (i.e., a number of seconds, the duration of delivery of the pre-recorded message, etc.). If the silence condition is continuously detected by silence detector 34, the entire pre-recorded message is delivered to recipient 42 by message player 18b as shown in step 178. If energy of a predetermined threshold is detected in step 176 (i.e., no silence detected) prior to the delivery of a predetermined portion of the message, then message delivery system 1 stops delivery of the message and continues to monitor the inbound communication medium 28a (step 168) until the predetermined energy/silence condition is detected. Once such energy/silence condition is detected (step 170), the pre-recorded message is played from its beginning (step 172). However, if energy is detected in step 176 after a predetermined portion of the message is delivered, message delivery system 1 may, in one aspect of the invention, record and store the energy that is detected, and continue delivery of the undelivered portion of the pre-recorded message upon detection of the predetermined energy/silence condition. Moreover, the method may be devised such that if a brief period of energy is detected, system 1 pauses during the period of energy detection, and subsequently recommences when the predetermined silence condition resumes. Upon delivery of the entire message or a predetermined portion of the message, the system is disconnected from the PSTN 40, as illustrated in step 180.

The foregoing is to be understood as being in every respect illustrative and exemplary, but not restrictive, and the scope of the invention disclosed herein is not to be determined from the Detailed Description, but rather from the claims as interpreted according to the full breadth permitted by law. It is to be understood that the embodiments shown and described herein are only illustrative of the principles of the present invention and that various modifications may be implemented by those skilled in the art without departing from the scope and spirit of the invention. For example, this description uses a silence detector, but any form of noise detection, energy detection or speech detection may be used. The description also uses live recipients and recording devices, such as voice-mail systems, answering machines, as intended receivers of the pre-recorded message, but any means for receiving a pre-recorded message is understood to be an equivalent. Further, the description uses a four-wire communication medium, but any signalling system comprising an inbound signal and outbound signal may be employed. The description of the preferred embodiment also uses a public switch telephone network (PSTN), but any communication network may be used.

We claim:

1. A method for delivering a message over a telecommunications network to a recipient, comprising the steps of:

delaying initial transmission of said message until a predetermined silence condition is met;

transmitting said message over said telecommunications network to said recipient when said predetermined silence condition is detected;

performing echo cancellation on a signal communicated from said telecommunications network; and continuously monitoring said signal to detect that said predetermined silence condition is satisfied throughout a predetermined portion of said transmitting of said message.

2. The method according to claim 1, wherein said message is a pre-recorded message.

3. The method according to claim 1, further comprising the step of terminating said transmitting step if said silence condition is no longer satisfied.

4. The method according to claim 3, further comprising the step of recommencing said transmitting step upon subsequent detection of said silence condition.

5. The method according to claim 4, wherein said transmitting step further comprises transmitting said message from the beginning.

6. The method according to claim 1, further comprising the step of recording and storing said signal from said telecommunications network.

7. The method according to claim 4, wherein said transmitting step is repeated until said message is delivered in its entirety.

8. The method according to claim 1, further comprising the steps of pausing said transmitting of said message when said silence condition is not met for a predetermined duration, and resuming said transmitting of said message upon subsequent detection of said silence condition.

9. The method according to claim 1, further comprising the step of monitoring said signal to detect a predetermined initiating energy condition.

10. The method according to claim 9, wherein said transmitting step is initiated when said initiating energy condition is detected.

11. The method according to claim 10, wherein said energy condition comprises a predetermined silence condition.

12. The method according to claim 10, wherein said energy condition comprises speech energy followed by a predetermined silence condition.

13. The method according to claim 10, wherein said transmitting step is performed within a predetermined time after detecting said energy condition.

14. The method according to claim 1, further comprising the steps of:

accessing said telecommunications network; and receiving said signal from said telecommunications network.

15. The method according to claim 14, wherein said accessing step comprises the steps of:

retrieving a telephone number corresponding to said recipient from a database; and dialing said number.

16. The method according to claim 14, further comprising the step of classifying the signal from said telecommunications network to determine whether an answer supervision condition is detected.

17. The method according to claim 16, wherein said accessing step is repeated when said answer supervision condition is not detected.

18. A system for delivering a message over a telecommunications network to a recipient, comprising:

a message player for delivering pre-recorded messages, wherein said message player waits to delivers said message until a predetermined initiating silence condition is met, initially delivers said message upon detection of a predetermined initiating silence condition, and said message player condition delivery of said message, while a predetermined second silence condition is detected;

a detector for monitoring an inbound signal from said network to detect said initiating silence condition and said second silence condition, said detector in communication with said message player; and an echo canceller in communication with said detector, message player and said network, wherein said echo canceller enables detection of energy transmitted by said recipient over said inbound signal.

19. The system according to claim 18, wherein said detector is a silence detector.

20. The system according to claim 18, wherein said detector is a speech detector.

21. The system according to claim 18, wherein said detector is an energy detector.

22. The system according to claim 18, further comprising a call classifier receiving a signal from said telecommunications network for detecting an answer supervision condition, and wherein said detector is activated when answer supervision is detected.

23. The system according to claim 18, further comprising a dialer for accessing said telecommunications network.

24. The system according to claim 23, further comprising a recipient database linked to said dialer for storing a telephone number corresponding to said recipient.

25. The system according to claim 24, further comprising a service controller for retrieving said telephone number from said recipient database and transmitting said telephone number to said telecommunications network.

26. The system according to claim 18, further comprising a message database linked to said message player for storing a pre-recorded message to be transmitted by said message player over said telecommunications network.

27. The system according to claim 26, further comprising a service controller for retrieving said message from said message database and transmitting said message to said message player.

* * * * *